United States Patent [19]

Levendis et al.

[11] Patent Number: 5,352,423
[45] Date of Patent: Oct. 4, 1994

[54] USE OF AROMATIC SALTS FOR SIMULTANEOUSLY REMOVING $SO_2$ AND $NO_x$ POLLUTANTS FROM EXHAUST OF A COMBUSTION SYSTEM

[75] Inventors: Yiannis A. Levendis, Boston; Donald L. Wise, Belmont, both of Mass.

[73] Assignee: Northeastern University, Boston, Mass.

[21] Appl. No.: 39,853

[22] Filed: Mar. 30, 1993

Related U.S. Application Data

[63] Continuation-in-part of Ser. No. 805,012, Dec. 11, 1991, Pat. No. 5,312,605.

[51] Int. Cl.$^5$ ............................................. B01D 53/34
[52] U.S. Cl. ........................... 423/235; 423/242.2; 423/243.08; 423/244.07
[58] Field of Search ............ 423/212 C, 212 R, 213.2, 423/213.5, 235, 635, 242.2, 243.08, 244.07

[56] References Cited

U.S. PATENT DOCUMENTS

| | | | |
|---|---|---|---|
| 3,962,864 | 6/1976 | Williams et al. | 60/39.16 R |
| 4,001,384 | 1/1977 | Iwakura et al. | 423/551 |
| 4,154,399 | 5/1979 | Riano | 239/139 |
| 4,178,357 | 12/1979 | Stoddard et al. | 423/522 |
| 4,253,926 | 3/1981 | Laurie | 204/157 |
| 4,297,321 | 10/1981 | Beranek | 422/145 |
| 4,299,192 | 11/1981 | Enga | 122/4 D |
| 4,302,425 | 11/1981 | Gamel | 422/161 |
| 4,304,550 | 12/1981 | Heian | 422/161 |
| 4,313,742 | 2/1982 | Ostlie | 55/241 |
| 4,323,371 | 4/1982 | Ritvanen | 55/19 |
| 4,381,718 | 5/1983 | Carver et al. | 110/347 |
| 4,389,323 | 6/1983 | Gancy | 252/70 |
| 4,419,331 | 12/1983 | Montalvo | 422/170 |
| 4,530,822 | 7/1985 | Ashley et al. | 423/242 |
| 4,545,879 | 10/1985 | Wan et al. | 204/158 R |
| 4,552,683 | 11/1985 | Powell et al. | 252/189 |
| 4,562,053 | 12/1985 | Andersson | 423/235 |
| 4,600,569 | 7/1986 | Yoon | 423/243 |
| 4,615,871 | 10/1986 | Yoon | 423/243 |
| 4,624,191 | 11/1986 | Zauderer et al. | 110/264 |
| 4,676,960 | 6/1987 | Keller et al. | 423/240 |
| 4,833,877 | 5/1989 | Ahland et al. | 60/39.02 |
| 4,861,577 | 8/1989 | Talonen et al. | 423/577 |
| 4,874,591 | 10/1989 | Jeney | 423/240 |
| 5,019,361 | 5/1991 | Hakka | 423/243 |
| 5,081,095 | 1/1992 | Bedford et al. | 502/304 |
| 5,116,584 | 5/1992 | Chen et al. | 423/235 |

FOREIGN PATENT DOCUMENTS

| | | | |
|---|---|---|---|
| 2460010 | 7/1975 | Fed. Rep. of Germany | 423/242.2 |
| 2502117 | 7/1975 | Fed. Rep. of Germany | 423/235 |
| 2752901 | 5/1979 | Fed. Rep. of Germany | 423/235 |
| 3505027 | 8/1986 | Fed. Rep. of Germany | 423/235 |
| 49-52178 | 5/1974 | Japan | 423/242.2 |
| 0090168 | 8/1978 | Japan . | |
| 0128023 | 11/1978 | Japan . | |

OTHER PUBLICATIONS

Cole et al., "Fundamental Studies of Sorbent Reactivity in Isothermal Reactors," Paper 16, proceedings: Joint Symposium on Dry $SO_2$ and Simultaneous $SO_2/NO_x$ Control Technologies, 1, EPRI CS–4966, Dec. 1986.
Lowry, "Chemistry of Coal Utilization," John Wiley & Sons, NY (1946).

*Primary Examiner*—Gary P. Straub
*Assistant Examiner*—Timothy C. Vanoy
*Attorney, Agent, or Firm*—Weingarten, Schurgin, Gagnebin & Hayes

[57] ABSTRACT

A method is disclosed for removing pollutants from the exhaust of combustion systems burning fuels containing substantial amounts of sulfur and nitrogen. An exemplary method of the invention involves the formation and reaction of a sorbent comprising calcium benzoate. The calcium benzoate is either dry-sprayed (in the form of a fine powder) or wet-sprayed in an aqueous solution in a high temperature environment such as a combustion chamber. The latter technique is feasible since calcium benzoate is a water-soluble form of calcium. When the dispersed particles of calcium benzoate are heated to a high temperature, the organic benzoate burns off and fine calcium oxide particles are formed. These particles are cenospheric (hollow) and have thin and highly porous walls, thus, affording optimum external and internal accessibility for reacting with toxic gaseous emissions such as $SO_2$. Further, the combustion of the organic benzoate portion of the sorbent results in the conversion of $NO_x$ to $N_2$.

20 Claims, 3 Drawing Sheets

FIG. 2A X1000
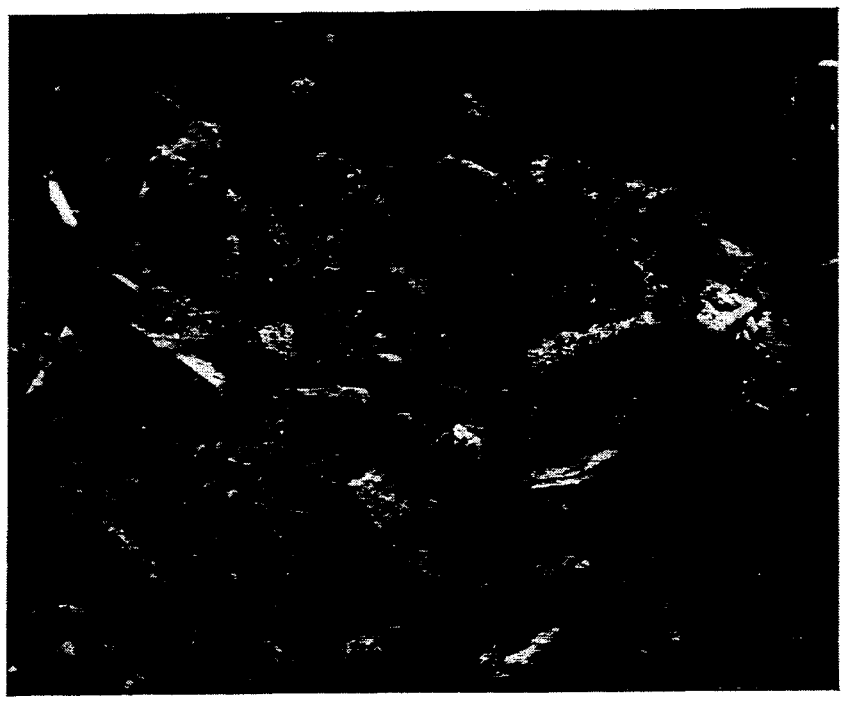
FIG. 2B X200

FIG. 3A X1700
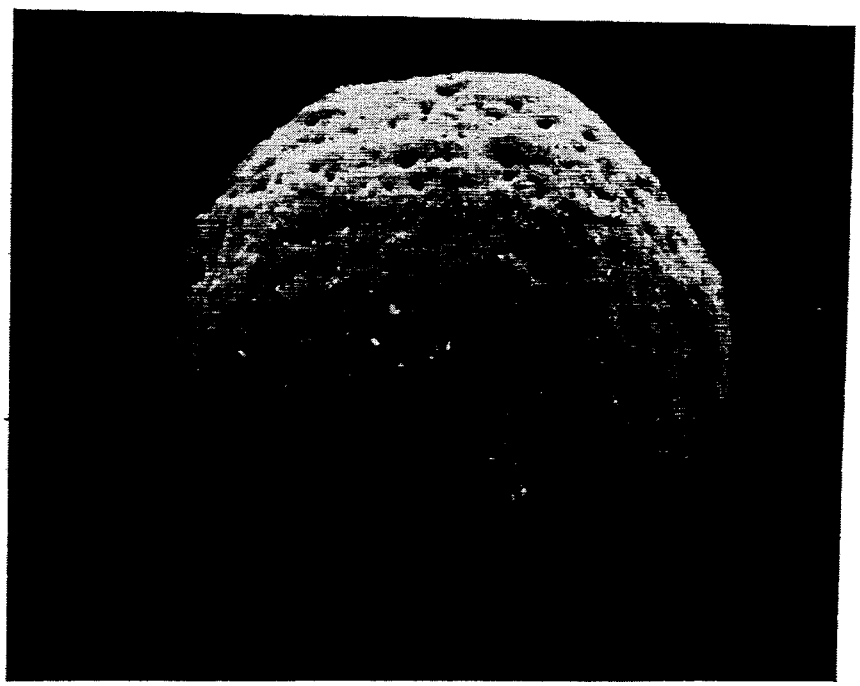
FIG. 3B X900

USE OF AROMATIC SALTS FOR SIMULTANEOUSLY REMOVING SO₂ AND NO_x POLLUTANTS FROM EXHAUST OF A COMBUSTION SYSTEM

Part of the work leading to this invention was carried out with funds provided by the United States Government as represented by the Department of Energy. Therefore, the U.S. Government has certain rights in this invention.

RELATED APPLICATION

This application is a continuation-in-part of U.S. Ser. No. 07/805,012 filed Dec. 11, 1991, now U.S. Pat. No. 5,312,605 entitled METHOD FOR SIMULTANEOUSLY REMOVING $SO_2$ AND $NO_x$ POLLUTANTS FROM EXHAUST OF A COMBUSTION SYSTEM, the whole of which is hereby incorporated by reference herein.

FIELD OF THE INVENTION

The present invention relates to the control of pollutant emissions, and more particularly to a method for controlling the pollutants of combustion systems.

BACKGROUND OF THE INVENTION

Techniques are known for controlling emissions of sulfur dioxide ($SO_2$) or nitrogen oxides ($NO_x$) which are toxic oxidation products emitted from combustion systems such as power plants.

For $SO_2$ control, wet scrubbing towers permit effluent gases to pass through beds of limestone, dolomite, and other calcium-containing compounds or catalysts. U.S. Pat. Nos. 3,962,864; 4,178,357; 4,302,425; 4,304,550; 4,313,742; and 4,562,053 illustrate various devices for cleaning flue gases. Wet scrubbing devices tend to be expensive because their complexity requires high operating costs. They also suffer from severe corrosion and plugging problems.

The wet scrubbing process has constantly been modified in the attempt to down-size the scale of equipment. U.S. Pat. No. 4,861,577 describes a method wherein exhaust gas is absorbed into a scrubbing solution which is then treated in an autoclave to decompose such compounds as thiosulfate and polythionates into elemental sulfur and sulfate. U.S. Pat. No. 5,019,361 discloses an amine salt absorbent that purportedly permits high recovery of sulfur dioxide with smaller equipment.

A technique related to wet scrubbing is the spraying of water slurries or dry powders of sulfur sorbents. Various spraying devices, some of which are used in conjunction with wet scrubbers, are shown in U.S. Pat. Nos. 4,001,384; 4,323,371; 4,419,331; and 4,530,822. These devices facilitate gas/liquid contact by atomization of liquids into flue or stack gases. Injection of sorbents can be implemented in the furnace or post-furnace zone, depending upon the thermodynamic and kinetic processes involved, thereby increasing the flexibility of the spraying technique.

Sulfur sorbent particles, ideally, should be small in size, porous, and able to mix well with the gases that are to be cleaned of pollutants. Typical sulfur sorbents are listed below ("Alternative $SO_2$ Sorbents," PSI Technology Company Report PSI-538/TR-744, 1987. RESEARCH PARK. P.O. Box 3100, Andover, Mass. 01810):

| Sorbent Class | Sorbent Type | Formula |
| --- | --- | --- |
| Lime/Limestone | Hydrated Dolomite | $Ca(OH)_2 \cdot Mg(OH)_2$ |
| | Hydrated Lime | $Ca(OH)_2$ |
| | Limestone | $CaCO_3$ |
| | Dolomite | $CaCO_3 \cdot MgCO_3$ |
| Alkali | Trona | $Na_2CO_3 \cdot NaHCO_3 \cdot 2H_2O$ |
| | Nahcolite | $NaHCO_3$ |
| Mixed Cation | Shortite | $Na_2Ca_2(CO_3)_3$ |
| | Gaylussite | $Na_2Ca(CO_3)_2 \cdot 5H_2O$ |
| | Pirssonite | $Na_2Ca(CO_3)_2 \cdot H_2O$ |
| | Eitelite | $Na_2Mg(CO_3)_2$ |

Upon injection into high-temperature environments, sulfur sorbents containing calcium undergo calcination or decomposition to an oxide (CaO). The same holds true for magnesium-based sorbents which oxidize to MgO, as taught in U.S. Pat. No. 4,874,591. The internal surface area and porosity of sorbents increase drastically during calcination. However, at higher temperatures, above 1000° C. for example, sintering occurs progressively, and the calcium oxide particles rapidly lose porosity and internal surface area.

Sulfation occurs subsequently to calcination. In other words, CaO reacts with $SO_2$ and $H_2S$ gases to form solid sulfate, sulfite or sulfide ($CaSO_4$, $CaSO_3$, or CaS). The extent of magnesium oxide reaction with $SO_2$ is not defined but is known to be much smaller than with calcium oxide. However, dolomite-based sorbents result in higher $SO_2$ capture efficiency than calcite-based sorbents which might be due to the larger total surface area of the former. (Cole et al., Paper 16 Proceedings: 1986 Joint Symposium on Dry $SO_2$ and Simultaneous $SO_2/NO_x$ Control Technologies. 1, EPRI CS-4966. December 1986). Furthermore, it has been reported that the presence of MgO promotes the catalytic oxidation of any existing $SO_3$ to $SO_2$. (Flagan et al., *Fundamentals of Air-Pollution Engineering*. Prentice-Hall, New Jersey, 1988.) The reactions may potentially occur in the internal pore surface of the CaO particles as well as upon the external particle surface. However, because of the high molar volume of the calcium sulfate (3.3 times that of CaO) the reaction product induces pore filling and entrance closure in the sorbent particle. Hence, the outer layer reacts first to form calcium sulfate, the pores plug up, and the core remains unreacted. Although the sorbent particles may be ground to micron size to minimize this waste, such an adjustment step is prohibitively expensive for power plant applications and other large-scale uses.

$NO_x$ can be controlled by either minimizing its formation during the combustion processes or destroying it (after it forms) in the effluent of combustion systems. Control of $NO_x$ formation in combustion systems can be achieved by modifying the design and the operating conditions of the furnaces so that the fuel burns in separate fuel-lean and fuel-rich stages.

A number of names have been applied to the various implementation of staged combustion, including: overfire air, off-stoichiometric combustion, and low-$NO_x$ burners. In staged combustion only part of the air required for complete combustion is supplied with the fuel. The remaining air is supplied through separate "overfire ports." This process provides the time and conditions required for $NO_x$ reduction to $N_2$. If this process is carried too far, HCN will be formed in large quantities (Flagan et al., supra). "Low-$NO_x$" burners utilize burner aerodynamics to slow the rate at which fuel and air are mixed (U.S. Pat. No. 4,381,718). The degree of control that can be reached by this method is limited by the need to achieve complete combustion within the volume of the combustor.

Post-combustion destruction of $NO_x$ includes techniques such as selective reduction of NO by ammonia ($NH_3$), urea ($H_2NCONH_2$), or isocyanic acid as well as selective catalytic reduction techniques (Flagan et al., supra).

SUMMARY OF THE INVENTION

The method of the invention is directed to controlling pollutant emissions from combustion systems. An exemplary method involves the production and reaction of a sorbent comprising aromatic salts of calcium, in particular calcium benzoate or calcium magnesium benzoate. Alternatively, an aromatic salt of any cation that forms an oxide reactive with gaseous compounds of the sulfur may be used in the method of the invention.

Preferably, the calcium benzoate is either dry-sprayed (in the form of a fine powder) or wet-sprayed in an aqueous solution in a high temperature environment such as a combustion or post-combustion zone of a furnace to provide fine particles necessary for reacting with hot gaseous sulfur/sulfur oxides and nitrogen oxides. Unlike calcium hydroxide, which is only slightly soluble in water, and calcium carbonate, which is not soluble in water, calcium benzoate or calcium magnesium benzoate may be completely dissolved in hot water up to 8.5% by weight. Thus, in one embodiment, a very fine mist of micron-sized droplets of calcium benzoate solution is sprayed into a coal combustion furnace where the water vaporizes and the organic benzoate volatilizes and burns, reducing $NO_x$ to $N_2$. In another embodiment, a very fine mist of calcium benzoate powder is dry-sprayed into a coal combustion furnace where the organic benzoate volatilizes and burns, reducing $NO_x$ to $N_2$.

The evaporation/combustion reactions of a calcium benzoate sorbent, in either dry or wet form, result in the formation of popcorn-like particles composed of calcium oxide. These particles are hollow, or cenospheric, with thin and porous walls. The as-formed particles are as small as or smaller than those obtained by conventional grinding techniques. Their walls contain micron-sized blow holes as well as meso- and micro-pores for optimum accessibility of the interior cavity to the gaseous sulfur compounds. As a result, the particles used in the method of the invention are highly efficient at binding sulfur compounds.

Either mode of implementation of the method of the invention, either wet or dry spraying of calcium benzoate into a high temperature zone of a furnace, requires low capital and operating costs and facilitates the retrofitting of existing facilities. The highly porous, cenospheric nature of the hollow particles of lime (CaO) resulting from the calcination of calcium benzoate provides for accessibility of the sulfur bearing gases to the entire matrix of the particles, not only to their peripheries. Accordingly, the volume of wasted or unreacted sorbent is minimized. Among resulting advantages are higher $SO_2$ capturing efficiencies associated with higher sorbent utilizations, and lower expenses arising from sorbent (ash) treatment and landfilling costs. Particularly advantageous is the virtually unlimited supply of the aromatic salts themselves since aromatic salts can be easily produced from fossil fuels, particularly coal.

DESCRIPTION OF THE DRAWINGS

A complete understanding of the advantages and features of the invention can be more readily obtained by reference to the following detailed description when considered in conjunction with the accompanying drawings wherein:

FIGS. 2a and 2b are photographs at magnifications of $100\times$ and $200\times$, respectively, of needle-like structures of commercially purchased, high purity calcium benzoate.

FIGS. 3a and 3b are photographs at magnifications of $1700\times$ and $900\times$, respectively, of cenospheric calcium benzoate particles formed at 1000° C. in air by spraying a dry powder of calcium benzoate into a high temperature zone of a combustion chamber.

DETAILED DESCRIPTION OF THE INVENTION

Figure 1:
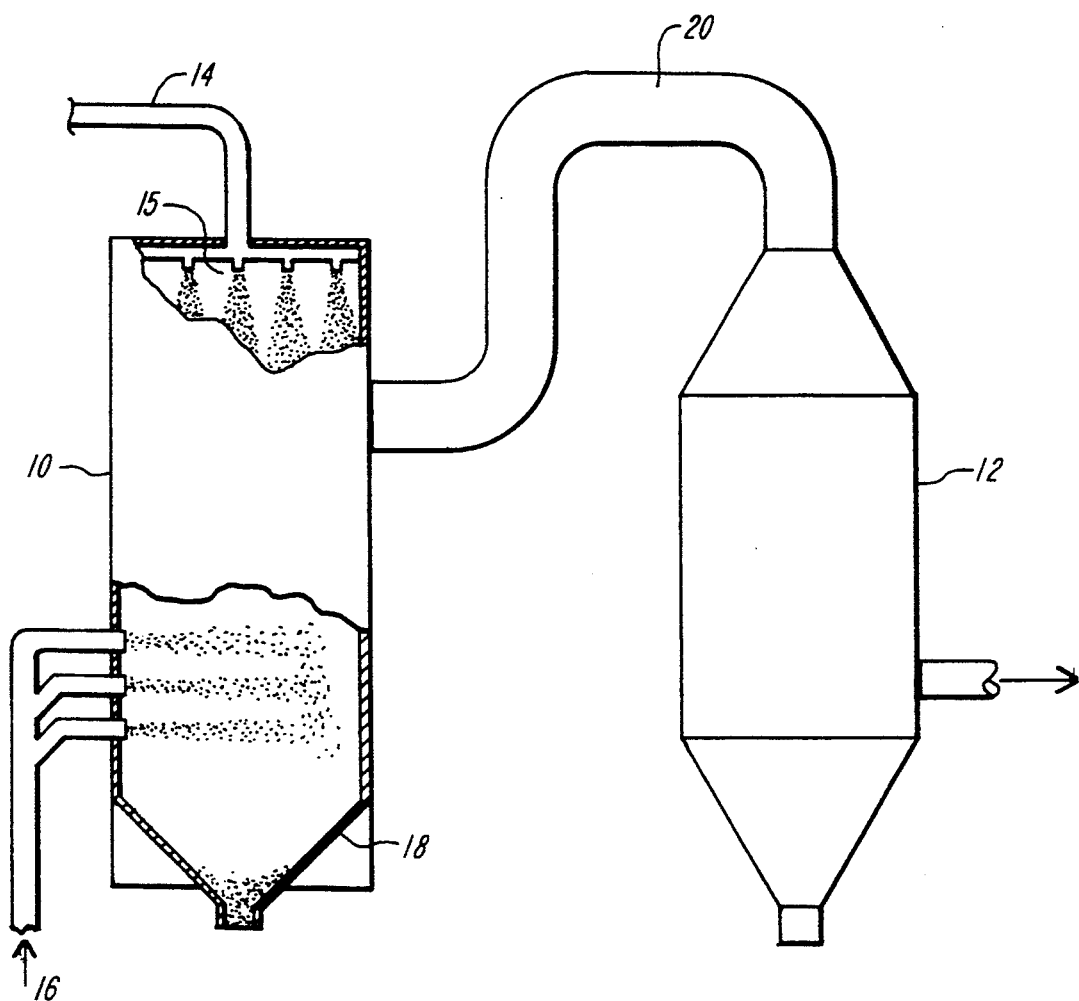
FIG. 1 is a schematic view of calcium benzoate being sprayed into a combustion chamber or post-combustion chamber.

Calcium benzoate is a water-soluble form of calcium which can be dissolved in hot water in concentrations of up to 8.5% by weight. In an aqueous solution, calcium benzoate is believed to be dissociated as calcium ions ($Ca^{2+}$) and benzoate ions ($C_6H_5COO^-$). When atomized and flash evaporated into a combustion zone, the organic ligand, benzoate, pyrolyzes and forms hydrocarbon radicals which eventually are burned to CO or $CO_2$ and $H_2O$, and in the process reduce $NO_x$ to $N_2$. This evolution of the organics from the sorbent particles is simultaneous with the oxidation of calcium, resulting in an aerosol of very finely dispersed, dry particles of calcium oxide (CaO) ready for reaction with sulfur. The cenospheric, popcorn-like particles of calcium oxide (CaO) formed during the combustion allow easy penetration of the $SO_2$ gas to their hollow interior through the micron-size blow holes formed in the particle walls and easy utilization of the entire matrix of CaO. This process results in high capture efficiencies for $SO_2$ and conversion to $CaSO_4$.

Although the mechanism of this evaporation/combustion reaction may be complex, it is clear that using an aromatic salt of calcium to control sulfur and $NO_x$ emissions simultaneously has fundamental advantages. The dissolved calcium benzoate may be forced in solution thorough a nozzle, atomizer, nebulizer, or other such dispersal device, and sprayed as a mist of micron-size droplets into a high temperature zone whereupon the water of solution vaporizes. Alternatively, a dry powder of calcium benzoate particles may be sprayed directly into the high temperature environment. The high temperature zone may be in a combustion furnace or post-combustion zone of a coal burning power plant, an oil-fired furnace, an industrial furnace, an incinerator, or any other combustion system, including a diesel engine or other type of internal combustion engine.

Referring to FIG. 1, in a typical furnace, consisting of a boiler 10 and attached scrubber 12, calcium benzoate (the commercial, high purity compound having the needle-like structures shown in FIGS. 2a and 2b) is provided in the form of a fine mist of micron-sized droplets at the top of the boiler 10, via wet spray injection line 14 and nozzles 15, while a pulverized coal flame is fed into the boiler via coal feed line 16. As the water in the sorbent solution vaporizes, the organic benzoate pyrolyzes, oxidizes, and hydrocarbon radicals which react with the nitrogen oxides to form $N_2$. At the same time, as described, hollow and highly porous calcium oxide particles are formed and react with the noxious sulfur oxide gases. The reacted particles settle as ash into the ash hopper 18 at the base of the boiler while unreacted flue gases pass to scrubber 12 via flue pipe 20.

Alternatively, in an exemplary process, dry calcium benzoate powders were sprayed in a laminar flow furnace at a temperature of 1000° C. into a gas containing 5% $O_2$, 1500 ppm of $NO_x$, 3000 ppm of $SO_2$ and a balance of $N_2$. The Ca/S ratio was 1. It was found that, in the treated exiting gas, $SO_2$ was reduced by $\sim 70\%$ and $NO_x$ was reduced by $\sim 75\%$.

Referring to FIGS. 3a and 3b, the hollow, as-formed particles of calcium oxide have highly porous walls, with a porosity of approximately 75% and a BET total internal and external surface area in the range of 20–40 $m^2/g$. They contain large micron-sized blowholes as well as meso-pores $\sim 150$ nm in diameter for providing the gaseous sulfur dioxide maximum accessibility to internal as well as external reaction sites.

The overall reaction mechanism for simultaneous $NO_x$ and $SO_2$ removal is:

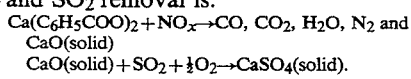

$$Ca(C_6H_5COO)_2 + NO_x \rightarrow CO, CO_2, H_2O, N_2 \text{ and } CaO(\text{solid})$$
$$CaO(\text{solid}) + SO_2 + \tfrac{1}{2}O_2 \rightarrow CaSO_4(\text{solid}).$$

As the temperature is increased, the reaction is thermodynamically less favorable but proceeds to completion at a faster rate. Alternatively, commercially available calcium magnesium benzoate or other aromatic salts may be used.

Other aromatic sorbents are also useful in the method of the invention and include alkali metal or alkaline earth metal salts of aromatic compounds including, but not limited to, p-hydroxybenzoic acid, protocatechuic acid, cinnamic acid, vanillic acid, vanillin, syringic acid, and ferulic acid.

Aromatic calcium salts may be produced in such large quantities from coal and other fossil fuels that their supply is virtually unlimited. High purity of the sorbent is not at all necessary for the method of the invention. Procedures for the isolation of mixtures of aromatic acids from low-grade fossil fuels are described in Lowry, *Chemistry of Coal Utilization*, Vol 1, John Wiley & Sons, New York, 1946, the whole of which is herein incorporated by reference. Aromatic acids can be converted to the desired salt by ion exchange in an aqueous solution using, e.g., a mix of acetic acid and calcite or dolomite stone pH=4. Addition of a base such as $Ca(OH)_2$ drives the reaction to completion.

Other embodiments of the invention will be apparent to those skilled in the art from a consideration of this specification or practice of the invention disclosed herein. It is intended that the specification and the examples be considered as exemplary only, with the true scope and spirit of the invention being indicated by the following claims.

What is claimed is:

1. A method for simultaneously removing $SO_2$ and $NO_x$ pollutant emissions from a combustion system, consisting essentially of the steps of:
   providing an aromatic salt of a cation that forms an oxide reactive with gaseous compounds of sulfur; and
   spraying said aromatic salt into a high temperature environment of a combustion system in the presence of gaseous compounds including $SO_2$ and $NO_x$ pollutants resulting from combustion in said combustion system, the aromatic anion of said salt pyrolyzing and controlling $NO_x$ pollutants and, simultaneously, cenospheric, porous particles of an oxide of said cation forming and controlling $SO_2$ pollutants.

2. The method of claim 1, wherein said aromatic salt is sprayed into the high temperature environment of a combustion zone.

3. The method of claim 1, wherein said aromatic salt is sprayed into the high temperature environment of a postcombustion zone.

4. The method of claim 1, wherein in said providing step said aromatic salt is in the form of an aqueous solution of said salt.

5. The method of claim 1, wherein in said providing step said aromatic salt is in dry form.

6. The method of claim 1, wherein in said providing step said aromatic salt comprises calcium as a cation.

7. The method of claim 1, wherein in said providing step said aromatic salt comprises benzoate as an anion.

8. The method of claim 1, wherein said aromatic salt includes calcium benzoate.

9. The method of claim 1, wherein said aromatic salt includes calcium magnesium benzoate.

10. A method for simultaneously removing $SO_2$ and $NO_x$ pollutant emissions from a combustion system, consisting essentially of the steps of:
    providing calcium benzoate salt; and
    spraying said calcium benzoate salt into a high temperature environment of a combustion system in the presence of gaseous compounds including $SO_2$ and $NO_x$ pollutants resulting from combustion in said combustion system, the benzoate anion of said calcium benzoate salt pyrolyzing and controlling $NO_x$ pollutants and, simultaneously, cenospheric, porous particles of calcium oxide forming and controlling $SO_2$ pollutants.

11. The method of claim 10, wherein said calcium benzoate salt is in an aqueous solution.

12. The method of claim 10, wherein said calcium benzoate salt is in dry form.

13. The method of claim 10, wherein said calcium benzoate salt is sprayed into the high temperature environment of a combustion zone.

14. The method of claim 10, wherein said calcium benzoate salt is sprayed into the high temperature environment of a postcombustion zone.

15. The method of claim 11, wherein said spraying step further comprises the use of a nozzle.

16. The method of claim 10, wherein said high temperature environment is separated from a combustion zone which emits sulfur.

17. The method of claim 10, further comprising the step of accumulating and removing reaction products from said high temperature environment.

18. A method for simultaneously removing $SO_2$ and $NO_x$ pollutant emissions from a combustion system, consisting essentially of the steps of:
    providing calcium benzoate salt; and
    spraying said calcium benzoate salt into the high-temperature post combustion zone of an internal combustion engine system in the presence of gaseous compounds including $SO_2$ and $NO_x$ pollutants resulting from combustion in said internal combustion engine, the benzoate anion of said calcium benzoate salt pyrolyzing and controlling $NO_x$ pollutants and, simultaneously, cenospheric, porous particles of calcium oxide forming and controlling $SO_2$ pollutants.

19. The method of claim 18, wherein said calcium benzoate salt is in an aqueous solution.

20. The method of claim 18, wherein said calcium benzoate salt is in dry form.

* * * * *

UNITED STATES PATENT AND TRADEMARK OFFICE
CERTIFICATE OF CORRECTION

PATENT NO. : 5,352,423
DATED : October 4, 1994
INVENTOR(S) : Yiannis A. Levendis, et al.

It is certified that error appears in the above-indentified patent and that said Letters Patent is hereby corrected as shown below:

Column 2, in the table in the Formula column, line 9, "$Na_2Ca(CO_3)_2H_2O$" should read --$Na_2Ca(CO_3)_2 \cdot H_2O$--.

Signed and Sealed this

Seventh Day of March, 1995

*Attest:*

BRUCE LEHMAN

*Attesting Officer*  *Commissioner of Patents and Trademarks*